Jan. 8, 1929.　　　　F. C. MORROW　　　1,698,446
MECHANICAL MOVEMENT
Filed March 24, 1928　　2 Sheets-Sheet 1
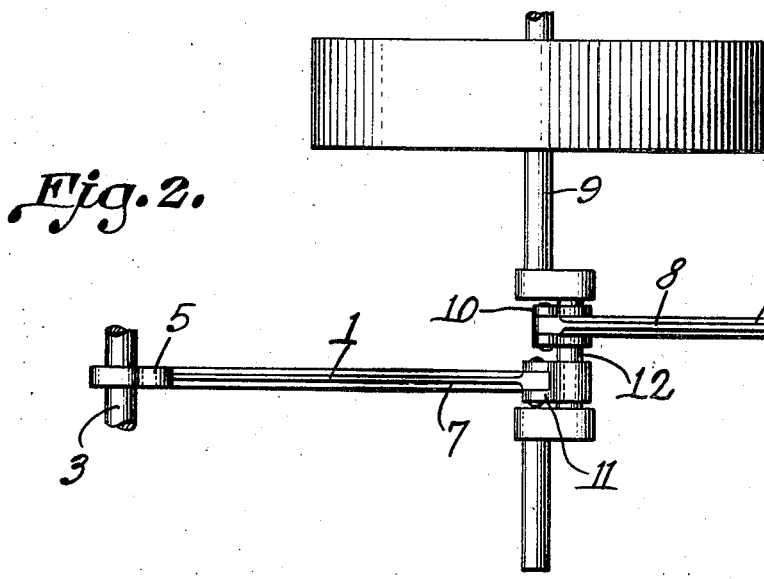
F. C. Morrow
Inventor Jan. 8, 1929.　　　　　F. C. MORROW　　　　　1,698,446
MECHANICAL MOVEMENT
Filed March 24, 1928　　　2 Sheets-Sheet 2
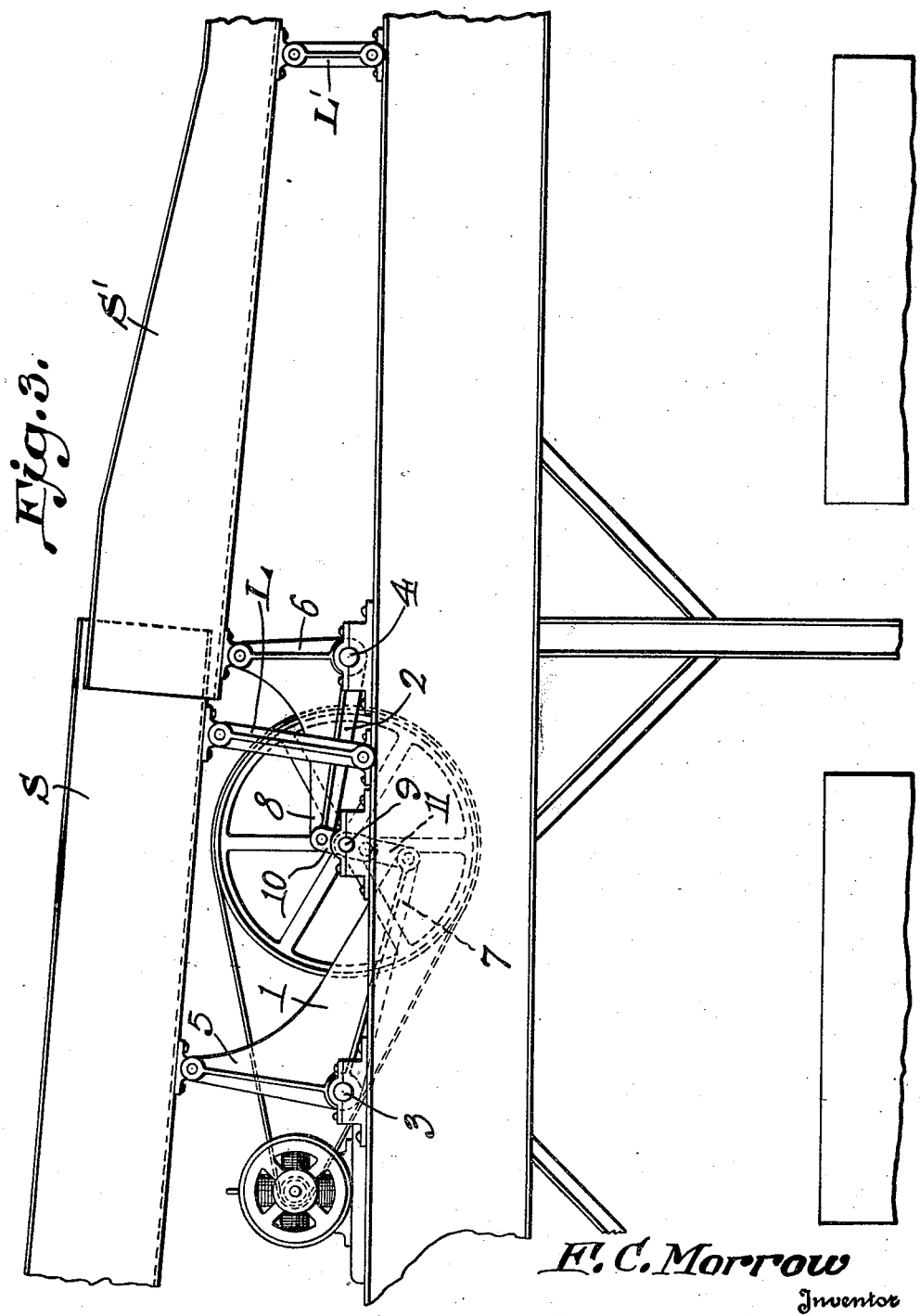

Patented Jan. 8, 1929.

1,698,446

UNITED STATES PATENT OFFICE.

FRANK C. MORROW, OF WELLSTON, OHIO.

MECHANICAL MOVEMENT.

Application filed March 24, 1928. Serial No. 264,493.

This invention relates to a mechanical movement or machine element utilized for the purpose of converting uniform rotary motion into variable reciprocating motion, one of the objects being to provide a means whereby, during the continuous uniform rotation of the drive element, two driven element will be reciprocated in opposite directions respectively at variable speeds, the movement of each reciprocating element in one direction being the same as that of the other reciprocating element when moving in the same direction.

A further object is to provide a device of this character which will so actuate the driven elements that each of them will move in one direction at a gradually increasing speed and in the reverse direction with a sudden reduction of speed.

A still further object is to provide a structure wherein the driven elements, by operating in opposite directions respectively, will maintain a balanced or substantially balanced load and thus permit of a considerable reduction in the power required to actuate the parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a side elevation of a machine element such as constitutes the present invention.

Figure 2 is a plan view thereof.

Figure 3 is a side elevation showing one application of the machine element or mechanical movement.

Referring to the figures by characters of reference 1 and 2 designate opposed bell cranks pivotally mounted at 3 and 4 respectively. Each of these bell cranks has an upwardly extending arm, shown at 5 and 6. The lower arm 7 of the bell crank 1 is extended toward the lower arm 8 of the bell crank 2, the free ends of these lower arms being located substantially diametrically opposite the axis of rotation of a shaft 9. This shaft has oppositely extending links 10 and 11 connected to a crank 12 forming a part of the shaft, the link 10 constituting means for connecting the arm 8 of bell crank 2 to the crank 12 while link 11 connects said crank to the arm 7 of the bell crank 1.

It will be obvious that when the shaft 9 is rotated in the direction indicated by the arrow in Figure 1, motion will be transmitted from its crank 12 through the links 10 and 11 so that arms 5 and 6 will be moved toward each other during the first half rotation of the shaft and away from each other during the second half rotation. It will be noted by referring particularly to Figure 1 that during the movement of the crank 12 through an arc of ninety degrees from position I to position II the upper end of the arm 5 will move the short distance from position $a$ to position $b$ while at the same time the upper end of arm 6 will move the relatively long distance from position A to position B. During the movement of the crank 12 through the next arc of ninety degrees from position II to position III the movement of the upper end of arm 5 will be increased so that said arm will travel from position $b$ to position $c$ while at the same time the upper end of the arm 6 will be reduced in speed so as to move from position B to position C.

Following the foregoing operation the crank 12 begins travelling through its third arc of ninety degrees, causing the arm 5 to move backwardly from position $c'$ to position $d'$ while, during the corresponding period, the upper end of arm 6 moves in the opposite direction from position C' to position D'. During the final arc of rotation of the crank the upper end of arm 5 is returned to position $a'$ through a comparatively short path of travel while, at the same time, the upper end of arm 6 is travelling through a much longer path between position D' and position A'. In other words, as the crank 12 travels from position IV in Figure 1 to position II in said figure the upper end of arm 5 moves back and forth from position $d'$ to $a'$ and from this latter position to $b$, all told a relatively short path while, at the same time, the upper end of arm 6 is moved from position $d'$ to position $a'$ and thence from position A' to position $b$, which is quite an extended path. The action resulting from this operation is as follows: As the arm 5 is moving slowly from position $d'$ to position $a'$ and thence back to position $b$, the upper end of arm 6 is rapidly moved to the right in Figure 1 to its extreme position and jerked backwardly following which the speed of movement is slowed down so that, as the upper end of arm 6 is moving from position $D'$ to $C'$ and thence to B the upper end of arm 5 is moved rapidly to its extreme position at the right and jerked backwardly to position $d'$. Thus, while the upper ends of both arms 5 and 6 have a variable movement and work oppositely to each other, the movement of each arm toward the right is approximately the same as that of the other arm and the movement of each arm toward the left corresponds with that of the other arm when moved toward the left. In other words, each arm, as it is moved toward the right travels at high speed during the latter portion of said movement and is then abruptly jerked backwardly toward the left. During the latter portion of this left movement it is slowed down and gradually reversed toward the right.

For the purpose of disclosing the utility of this structure one application thereof has been illustrated in Figure 3 wherein separate screens have been shown at S and S'. These screens are arranged so that the screen S discharges into the screen S'. The arm 5 of bell crank 1 is pivotally connected to the screen S and this screen is also supported by a link L parallel with the arm 5. The arm 6 of the bell crank 2 is connected to the screen S' and this latter screen is also supported by a link L' parallel with arm 6. Thus it will be seen that when the two bell cranks are actuated as before explained the screen S will be moved toward the right while screen S' is moving toward the left. The speed of movement of the screen S will increase until it reaches its maximum at the limit of right hand movement at which time said screen S will be jerked backwardly, causing any material thereon to shift forwardly on the screen S and some of it will be delivered on to the screen S'. Immediately following this rapid backward jerking of the screen S, or rather, simultaneously therewith, the screen S' is moved slowly forward, its speed increasing as it travels to the right until maximum speed is reached.

After the maximum speed is reached the screen S' will be suddeny jerked to the left, thus tending to feed to the right any material resting on the screen S'. As screen S' moves to the left screen S is moving toward the right whereupon the operation already described will be repeated. Thus it will be seen that material placed on the screens will be fed in one direction therealong whether said screens be horizontal or inclined and as the two screens move in opposition to each other and at approximately the same ratios of speed, it will be obvious that the load on the shaft 9 will be split inasmuch as the two screens will maintain practically a balance, thereby permitting a considerable reduction in the power necessary to operate the mechanism.

What is claimed is:

1. Means for converting rotary motion into reciprocating motion to actuate separate elements at variable speeds in opposite directions respectively, the speed of movement of each element in each direction corresponding with the speed of movement of the other element in the same direction, said means including opposed pivotally mounted members constituting bell cranks or their equivalents, a crank mounted for rotation between the pivots of said members, oppositely extending links connecting said crank to the respective bell cranks.

2. A device for converting rotary motion into variable reciprocating motion whereby opposed elements are moved in opposite directions respectively, the speed of movement of each element in each direction corresponding with the speed of movement of the other element while moving in the same direction, said means including oppositely disposed bell cranks having arms extended toward each other from the pivots of the respective bell cranks and other arms extended away from said pivots in the same general direction for attachment to the elements to be reciprocated, a crank mounted for rotation between the first named arms of bell cranks, and link connections between said crank and said arms, the points of connection between the links and arms being substantially diametrically opposed relative to the crank axis of rotation.

3. In a device of the class described the combination with opposed bell cranks having arms extended toward each other in lapped relation and arms extended away from the pivots of the bell crank along substantially parallel lines, said last named arms constituting means for engaging and actuating elements to be reciprocated, of a crank mounted for rotation about an axis extending between the lapping arms, links connecting said crank to the respective last named arms, the points of connection between the links and arms being substantially diametrically opposite to each other with reference to the axis of rotation of the crank, said crank, links and bell cranks cooperating to set up a rapid back and forth movement of one of the bell cranks during a relatively slow back and forth movement of the other bell crank, the movement of each bell crank being opposite to that of the other bell crank.

4. The combination with separate members mounted for reciprocation, of means for reciprocating said members at varying speeds in opposite directions respectively, the speed of movement of each member in either direction corresponding with the speed of movement of the other member in the same direction, said means including oppositely disposed bell cranks connected to the respective members and having arms extended toward each other, a crank mounted for uniform rotation about an axis extending between said arms, and link connections between said crank and the respective arms, the points of connection between the links and arms being at diametrically opposed points relative to the axis of rotation of the crank, said crank, links and bell cranks cooperating to accelerate the movement of each of the reciprocating members when travelling in one direction, abruptly reverse the movement of each member on reaching the limit of said movement in one direction and gradually reduce the speed of said element on approaching the other limit of its movement.

5. The combination with screens mounted for reciprocation and disposed one beyond the other, of a drive shaft, and means actuated by the drive shaft for moving the screens simultaneously in opposite directions respectively, each screen, during one half the rotation of the crank, being moved back and forth along a path greater than one half the path of movement of said screen and, during the second half of rotation of the crank, being moved back and forth through a path less than one half the path of movement of the screen, the maximum speed of movement of each screen being produced immediately preceding and following the arrival of the screen at the point nearest the delivery end of the machine.

In testimony that I claim the foregoing as my own, I have hereto affixed my signature.

FRANK C. MORROW.